March 15, 1966

S. J. SPÄTH 3,240,013

CONTROL OF THE FUEL QUANTITY FOR GAS
TURBINE DRIVING SYSTEMS

Filed Feb. 27, 1962

INVENTOR.
SIEGFRIED J. SPÄTH

BY Dicke and Craig

ATTORNEYS.

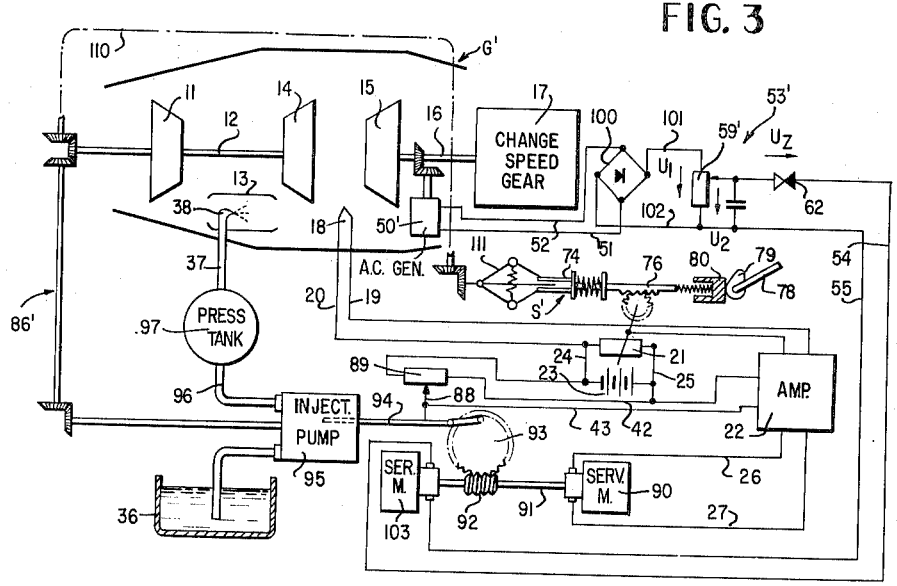

United States Patent Office 3,240,013
Patented Mar. 15, 1966

3,240,013
CONTROL OF THE FUEL QUANTITY FOR GAS TURBINE DRIVING SYSTEMS
Siegfried J. Späth, Schmiden, Kreis Waiblingen, Germany, assignor to Daimler-Benz Aktiengesellschaft, Stuttgart-Unterturkheim, Germany
Filed Feb. 27, 1962, Ser. No. 176,079
Claims priority, application Germany, Mar. 2, 1961, D 35,541
7 Claims. (Cl. 60—39.28)

The present invention relates to an electrically-operated control of the fuel quantity for gas turbine driving units in dependence upon the temperature of the fuel or driving gases produced, whereby a speed limiter is provided which will override the temperature control installation and temporarily reduce the injection quantity when the admissible rotational speed has been exceeded.

Control devices for gas turbine drive units are already known with the amount of fuel thereof as the magnitude to be adjusted and with the turbine exit or outlet temperature and the turbine rotational speed as equivalent controlling factors, i.e., of equal significance or weight, in which the temperature control deviation is electrically represented at the output of an amplifier as direct current the polarity of which corresponds to the direction of the control deviation, and in which the speed control deviation is also electrically represented in the form of a direct current, the polarity of which corresponds to the direction of the control deviation. In these known arrangements, a circuit is provided which compares the two direct-current control deviations, and which, with differing polarity, will effectively switch that control deviation to the adjusting element which reduces the amount of fuel, which, with the same polarity reducing the quantity of fuel, will switch the greater control deviation to the adjusting element, and which, with the same polarity increasing the amount of fuel, will switch the smaller control deviation to the adjusting element. There is additionally provided for purposes of metering the fuel injection quantity a separate, mechanically-hydraulically-operated installation with a fuel-metering element and with a pressure adjusting device, which is actuated by a magnetic coil receiving the positive and negative signals of the electrical part of the temperature control installation. A fuel feed pump supplies merely an amount of circulating fuel, but not the metered injection quantity.

In control devices wherein the turbine outlet or discharge temperature and the speed are the two controlling factors independent of one another, it may occur that the temperature control element becomes inoperative or fails. In that case, with a negative speed control deviation, i.e., with the prevailing rotational speed below the desired value of rotational speed, no control could be realized any more because, due to the lack or absence of the temperature control deviation as a comparative magnitude, switching of the negative speed control deviation to the adjusting element is impossible.

In order to avoid this untenable operating condition in the known prior art control installations, a source of voltage is provided having a polarity such as to increase the fuel quantity which is connected with the output of the amplifier by means of a resistance which forms a voltage divider with one or several resistances connected in parallel with the internal resistance of the amplifier so that, when the amplifier fails, a direct current is produced at the output thereof with a polarity which increases the fuel quantity. This measure therefore represents a safety circuit for the amplifier of the thermo-elements which in case of failure of the temperature control member and/or of the amplifier or in case of failure of the provided chopper supplies a negative under-temperature signal.

The present invention has the aim of providing a control installation whose electrically-operated control circuits for metering and limiting the fuel quantity operate with the utmost operating safety and in which only those electrical installations and structural elements are used which meet these requirements so that an additional safety circuit to be operated if one of the operational circuits fails is not necessary. Furthermore, the construction in accordance with the present invention of the overall control unit is to be designed and arranged in such a manner as to obviate a separate, mechanically-hydraulically-operated metering installation for the amount of fuel to be injected.

This object is attained, according to the present invention, in that the voltage existing at the output of the amplifier of the temperature control installation serves for the actuation of elements, members or units which regulate and control the drive or the adjustment for the supply of the metered injection quantity.

The temperature control installation which consists of a control circuit provided with elements such as thermo elements sensing the temperature of the driving gases, with a potentiometer by means of which a datum or desired voltage is preselected, and with an amplifier, additionally includes, in accordance with the present invention, an operating circuit serving for the supply of the fuel which is controlled by a relay connected in the aforementioned control circuit.

The speed limiter consists of a control circuit in which voltage is produced dependent on or proportional to the rotary speed by means of which, according to the present invention, a further relay is energized which opens the aforementioned operating circuit when the maximum speed has been reached.

Accordingly, it is an object of the present invention to provide an electrically-operated temperature and speed limiting control installation for turbine drive units of the type described hereinabove which effectively eliminates, by simple means, the shortcomings and inadequacies of the prior art constructions noted hereinabove.

It is another object of the present invention to provide an electrically-operated control system which limits the temperature and speed of a gas turbine drive unit to assure utmost safety and reliability in operation thereof.

A further object of the present invention resides in the provision of an electrically-operated control system providing temperature and speed limit means that are reliable in operation, simple in structure and above all, obviate the need for separate safety circuits or the like to protect the drive unit in case of failure of one of the electrically operated control components.

Another object of the present invention resides in the provision of an electrically operated temperature and speed limiting control system for turbine drive units which obviates the need for separate mechanically-hydraulically operated metering installations for the fuel injection system.

These and other objects, features and advantages of the present invention will become more obvious from the following description when taken in connection with the accompanying drawing which shows, for purposes of illustration only, several embodiments in accordance with the present invention, and wherein FIGURE 1 is a schematic diagrammatic view of a control installation in accordance with the present invention;

FIGURE 3 is a schematic diagrammatic view of a still further modified embodiment of a control installation in accordance with the present invention;

FIGURE 4 is an electric voltage diagram;

FIGURE 5 is a diagram showing the interrelation between the temperature of the fuel or driving gases and the rotational speed of the compressor drive turbine taking into consideration the pump or surge limit of the compressor;

FIGURE 6 is a schematic diagram of a transistor connection; and

FIGURE 7 is a partial schematic diagram of a still further modified embodiment in accordance with the present invention in which also the speed of the compressor drive turbine is transmitted to the speed limiter.

Figure 1:
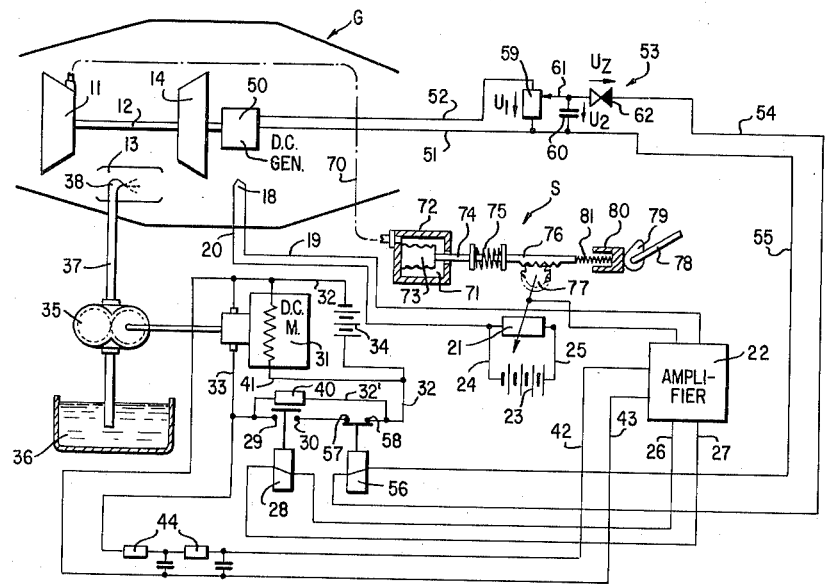
Figure 2:
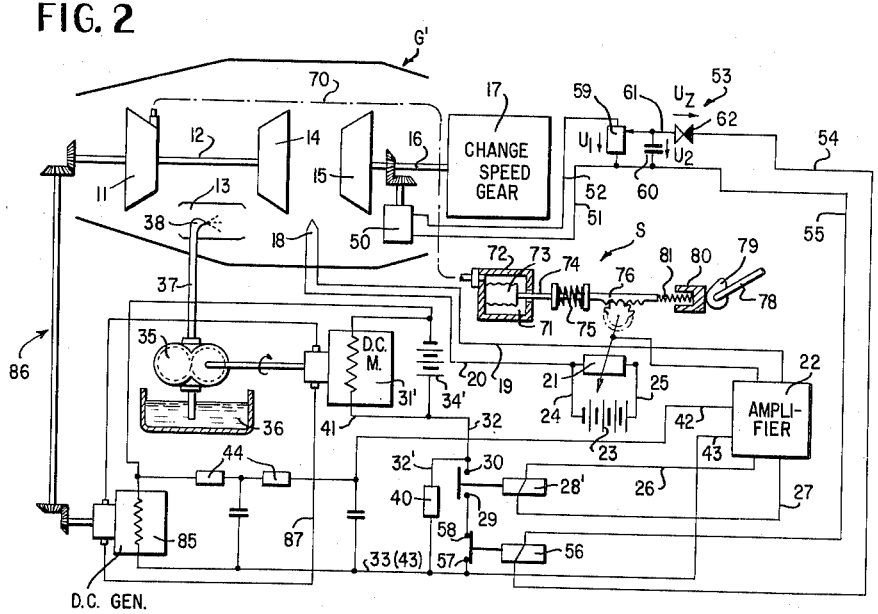
FIGURE 2 is a schematic diagrammatic view, similar to FIGURE 1, of a modified embodiment of a control installation in accordance with the present invention.

Referring now to the drawing wherein like reference numerals are used throughout the various views to designate corresponding parts, and more particularly to FIGURES 1, 2 and 3, the gas turbine driving units shown therein and generally designated in FIGURE 1 by reference character G and in FIGURES 2 and 3 by reference character G', consist in the main of a compressor 11, of a compressor drive shaft 12, of one or several combustion chamber 13 and of a compressor drive turbine 14. While the driving unit G shown in FIGURE 1 is a pure jet power plant, the driving unit G' according to FIGURES 2 and 3 additionally comprise a working or load turbine 15 which is mechanically separate from the compressor drive turbine 14 and which drives a reduction gear 17 by means of an output shaft 16. Several thermo-elements 18 of conventional construction and connected in parallel are provided in the channel behind the compressor drive turbine 14, for purposes of measuring the combustion gas temperature which thermo-elements are so connected through circuits 19 and 20 with a potentiometer 21 and with an amplifier 22 that there will appear at the input of amplifier 22 the difference between the potential of the thermo-elements 18 and of the voltage drop at the potentiometer 21, which is produced by auxiliary battery 23 over lines 24 and 25. This difference is zero, if the two potentials or voltages are equal in magnitude, i.e., when the potential selected on the potentiometer 21 corresponding to the datum value or desired magnitude of the temperature ($T_3$) coincides with the potential or voltage at the thermo-element corresponding to the actual value or prevailing magnitude of the temperature ($T_3$). If a difference occurs between the preselected, desired temperature and the actually prevailing temperature and therewith a voltage occurs at the amplifier 22, which may be a conventional direct-current amplifier for instance, an electron discharge tube amplifier, a magnetic amplifier or a transistor amplifier, then the switching relays 28 and 28' of FIGURES 1 and 2, respectively, and the servo-motor 90 of FIGURE 3 is actuated over lines 26 and 27. If the actually prevailing temperature $\overline{T'_3}$ at the thermo-elements 18 is, for instance, lower than the desired temperature $T_3$ at the potentiometer 21 consituting the desired magnitude transmitter set or adjusted by means of the preselecting installation 78, 79, etc., then a positive potential occurs at the amplifier 22 which, when amplified, acts on the switching relay 28 and causes closure of contacts 29 and 30 (FIGS. 1 and 2) or which, when amplified, drives the servo-motor 90 of FIG. 3 in such a direction that the quantity of fuel injected will be increased. As a result of the closure of contacts 29 and 30 by energization of relay 28, the direct current motor 31 (FIGURE 1), which has a constant excitation by means of its field winding supplied with current through circuit 41 and whose armature is now directly connected with the current source 34 through lines 32 and 33, will accelerate the fuel feed pump 35 which now draws in a larger amount of fuel from the tank 36 and forces it to the injection nozzle 38 through the line or conduit 37. This will result in a temporary increase in the prevailing temperature $T'_3$. If the temperature $T'_3$ measured by the thermo-elements 18, exceeds the preselected desired temperature $T_3$, then the positive input voltage on the amplifier 22 is again decreased to such an extent that the relay 28 becomes de-energized and opens its contacts 29 and 30 so that a resistance 40 provided in a circuit 32' bypassing the contacts of relays 28 and 56 will now become effective, whereby the direct current motor 31 and therewith the fuel feed pump 35 will decrease in the rotational speed thereof. A higher voltage will now reappear again at the amplifier 22, the switching relay 28 is attracted by energization thereof, the injection quantity increased, etc., so that finally a mean actual or prevailing temperature of the fuel gases will be established which corresponds to the desired temperature. Thus, the installation so far described produces an adjustment constituting a discontinuous or intermittent two-point control. The quantity injected and therewith the temperature is determined by the power supplied to the motor 31 which corresponds to the ratio between closure time and opening time of the relay 28. FIGURE 3, on the other hand, provides a continuous control.

The resistance 40 is preferably so selected that, with contacts 29 and 30 open, the speed of the pump 35 is so high that an idling-speed fuel quantity is supplied which lies above the combustion chamber burn-out limit.

In order to render possible a limitation of the rotational speed of the driving unit, particularly of the working or output turbine, in case of a sudden relieving or unloading thereof or in case of similar incidents, a speed limiter is additionally provided in accordance with the present invention. A speed-measuring direct-current generator 50 (FIG. 1) of conventional construction supplies over lines 51 and 52 a speed-dependent or speed-proportional voltage to a circuit generally designated by reference numeral 53, at the output of which, i.e., in the circuits 54 and 55 of which a voltage will appear only when the maximum admissible speed $n_{max}$ of the working turbine 15 is exceeded. A further relay 56 which control contacts 57 and 58 connected in lines 32 and 33, is selectively energized by this voltage whereby the rotational speed of the motor 31 and therewith also that of the fuel feed pump 35 is reduced and therewith the fuel quantity itself is also reduced.

The circuit 53 of FIGURES 1 and 2 is constructed in detail as follows:

The speed-proportional voltage supplied by the direct-current speed measuring means 50 is divided by means of a voltage divider formed, for instance, by a potentiometer 59 and smoothed out or filtered by means of condenser 60. This direct current-voltage potential is supplied to a zener-diode 62 and to the relay 56 through line 61, whereby line 51 serves as return lead. The operation of the circuit 53 is believed self-evident from the diagram of FIGURE 4. The voltages $U_1$ and $U_2$ corresponding to the total voltage drop in the voltage divider 59 and the portion thereof used in circuit 61, respectively, increase in proportion to the speed of the drive unit G or G'. Also the voltage $U_z$ at the zener diode 62 increases in proportion up to a point slightly below the maximum speed only to remain constant when the zener voltage $U_z$ has been reached. Below the zener voltage $U_z$, i.e., below the corresponding speed, only a very small blocking current flows through the zener diode 62. Only at maximum rotational speed or, respectively, just below the same, i.e., $U_2 > U_z$, will a voltage $U_3$ appear and will a current flow through the zener diode 62 and then over circuits 54 and 55 through relay 56 which is opened thereby for a corresponding period of time and thereby effects a throttling of the fuel supply to the combustion chambers 13 until the speed has been decreased to below the maximum speed.

Aside from the detrimental overheating of the blades, the compressor of the gas turbine is endangered within certain speed ranges by pumping occurring thereat. While the blades can ordinarily withstand excess temperatures of several seconds' duration without any great danger, pumping will set in immediately when the admissible or permissive gas temperature is exceeded at a given speed, even if only for a short time. This interrelation is evident from the diagram of FIGURE 5, wherein the rotational speed $n$ of the gas generator 11, 12, 13 and 14 is plotted along the abscissa and the temperature measured by the thermo-elements 18 is plotted along the ordinate, while the curve $p$ indicates the pump or surge limit. Care must be taken for the aforementioned reasons that the desired value transmitter formed by potentiometer 21 is adjusted during the acceleration condition of the turbine only as far as the pump limit $p$ will allow, i.e., in such a manner that a certain temperature $T_3$ is not exceeded at a given speed $n$. For this purpose, the anti-pumping installation generally designated by reference character S (FIGS. 1 and 2) and S' (FIG. 3) is provided in accordance with the present invention. In these installations S (FIGS. 1 and 2) the compressor discharge pressure $P_2$ is supplied, through line 70, to the internal space 71 of a housing 72, in which elastic pressure members or pressure responsive elements 73 are disposed which actuate an abutment rod 74 by means of a servo mechanism such as an amplifier (not shown), which abutment rod 74 is operatively connected by means of a compression spring 75 with a toothed rack 76 with which a pinion 77 of the potentiometer 21 is in meshing engagement. Reference numeral 78 designates a hand lever, actuated by the driver of the vehicle or by the pilot, which is rigidly connected to a cam 79 actuating a tappet or push rod 80 which acts on the toothed rack 76 by means of a relatively strong spring 81. Accordingly, the toothed rack 76 and therewith the desired magnitude transmitter 21 can be adjusted by means of lever 78 only to such an extent as the elastic pressure responsive elements 73 will allow through the abutment rod 74 in dependence upon the compressor discharge pressure $P_2$.

The amplifier 22 is also connected with the direct current motor 31 through lines 42 and 43, whereby line 42 includes resistances 44 of a filter network. This current circuit 42, 43, 44 has the purpose of exerting a damping effect on amplifier 22, particularly the adjusting speed thereof.

Differing from FIGURE 1, the switching relay 28' of FIGURE 2 controls the excitation of a Leonard-type generator 85 whose armature feeds the armature of the pump drive motor 31' through the electric circuit 87. The battery 34', in that case, merely energizes the field windings of the pump drive motor 31' and of the Leonard-type generator 85 while the driving power for the Leonard-type generator 85 is mechanically taken off the compressor drive shaft 12 through the drive generally designated by reference numeral 86. The particular advantage of the arrangement of FIGURE 2 resides in that only the comparatively low exciting energy or voltage of the Leonard-type generator 85 is controlled by relays 28' and 56.

In the embodiment of FIGURE 3, a servomotor 90, for example, constituted by a direct-current motor having steady excitation, which is coordinated to the temperature control portion of the installation, is supplied over lines 26 and 27 and, in turn, drives a worm gear 92 through a shaft 91. The worm gear 92 is in meshing engagement with a worm wheel 93 which adjusts the feed or supply quantity of a commercially available conventional injection pump 95 driven from the compressor drive shaft 12 by a drive generally designated by reference numeral 86. In order to obtain a smooth injection flow, a pressure tank or reservoir 97 is provided in the line 96 leading to the injection nozzle or nozzles 38. Furthermore, a wiper arm or sliding member 88 of a potentiometer 89 is taken along by the adjusting rod 94 which arm 88, in dependence upon the position and/or the displacement speed of rod 94, feeds back a signal to the amplifier 22 through lines 42 and 43 which signal serves for influencing, i.e., damping the adjustment speed.

In order to satisfy the interrelationship illustrated in FIGURE 5, a centrifugal governor 111 driven by a drive connection 110 is provided in the place of the pressure elements 73 of FIGURES 1 and 2 which regulates the abutment rod 74 in a manner analogous to the conditions described in connection with FIGURES 1 and 2. Furthermore, instead of a direct-current generator 50, an alternating-current generator 50' may be used, the output voltage of which is rectified by a rectifier 100 only schematically illustrated which may be a conventional full-wave rectifier bridge. The rectified voltage is then supplied to the potentiometer 59 and therewith to circuit generally designated by reference numeral 53' by means of lines 101 and 102. A servomotor 103 is supplied with rectified voltage through lines 54 and 55 which servomotor 103 adjusts the injection pump 95 in the direction of smaller injection quantities by means of the shaft 91, the worm gear 92, the worm wheel 93, and the adjusting rod 94. The servo-motor 103 is, in that case, so strong that it overrides the servomotor 90 coordinated to the temperature regulating portion. On the other hand, as long as no excess rotational speeds of the working or output turbine 15 occur, i.e., during normal regulating operation, the adjusting motor 103 does not receive any current through lines 54 and 55 so that the armature thereof is rotated by the servomotor 90.

Relays 28 or 28' and 56 in FIGURES 1 and 2 may also be replaced by switching transistors 120 and 121 so that the switching contacts necessary for relays are completely obviated whereby the reliability of the control installation is even further increased since transistors generally have a practically unlimited length of life.

As is obvious from FIGURE 7, in a driving unit having an output turbine 15, the direct-current generator 50 or the alternating-current generator 50' of the speed limiter may be driven from both the compressor drive shaft 12 and the output shaft 16 whereby each time the higher one of the two speeds thereof becomes effective. For this purpose, free-wheeling devices 114 and 115 such as one-way clutches are provided which are so installed and arranged between intermediate shafts 116' and 116" and intermediate shafts 117' and 117" that the shaft parts 116" and 117" may over take the shaft parts 116' and 117', respectively, whereby the aforementioned shafts are operatively connected by means of bevel gears with a common shaft 118 which drive the generators 50 and 50', respectively.

While I have shown and described several embodiments in accordance with the present invention, it is understood that the same is not limited thereto, but is susceptible of many changes and modifications within the spirit and scope thereof, I therefore do not wish to be limited to the details shown and described herein, but intend to cover all such changes and modifications as are encompassed by the scope of the appended claims.

I claim:
1. A control installation for selectively controlling the fuel quantity for gas turbine drive units comprising:
   fuel supply means provided with fuel adjusting means effectively enabling adjustment of the metered fuel quantity to be injected into the drive unit and with a working circuit including a first electrical path and a shunt path having switching means for effectively controlling said fuel adjusting means,
   temperature responsive control means operable in dependence on the temperature of the produced driving gases including temperature sensing means exposed to said driving gases, preselector means for pre-selecting a desired temperature having potentiometer means establishing a pre-selected voltage corresponding to said desired temperature, amplifier means, and first circuit means interconnecting said temperature sensing means and said preselector means with the input of said amplifier means in such a manner that the temperature deviation of the prevailing temperature in the gas turbine drive unit from the preselected desired temperature is represented at the output of said amplifier means as a direct-current voltage, the polarity of which corresponds to the direction of control deviation, second circuit means operatively connecting the output of said amplifier means with said switching means of said working circuit to selectively open said shunt path and therewith control said fuel adjusting means by said first-mentioned direct-current voltage to seek to substantially continuously adapt the prevailing temperature to said preselected desired temperature, and speed-limiting control means responsive to the speed of the drive unit and including generator means producing a voltage proportional to the speed of the drive unit and operable to effectively represent the control deviation of the prevailing speed of the drive unit from a maximum permissive speed thereof as a direct-current voltage, said speed limiting control means being operable to override said temperature-responsive control means only in response to the drive unit exceeding the permissive speed thereof to thereby temporarily reduce the injected fuel quantity, and third circuit means operatively connecting said generator means with said switching means of said working circuit to open said shunt path only when said permissive speed has been exceeded.

2. A control installation as defined in claim 1 and further including fourth circuit meanse operatively connecting said third circuit means with said switching means in such a manner that said speed-responsive control means overrides said temperature-responsive control means only in response to said gas turbine drive unit exceeding a predetermined permissive rotational speed to temporarily reduce thereby the quantity of injected fuel, said fourth circuit means including diode means effectively and substantially blocking any current flow in said fourth circuit means until shortly before reaching the maximum permissive speed, said working circuit including a direct-current motor, means drivingly connecting said motor with the fuel pump forming part of said fuel supply means, and direct current supply means feeding said motor.

3. A control installation for selectively controlling the fuel quantity for gas turbine drive units, comprising:

fuel supply means provided with fuel adjusting means effectively enabling adjustment of the metered fuel quantity to be injected into the drive unit and with a working circuit having two switching relay means for effectively controlling said fuel adjusting means, temperature-responsive control means operable in dependence on the temperature of the produced driving gases including temperature sensing means exposed to said driving gases, preselector means for pre-selecting a desired temperature having potentiometer means establishing a pre-selected voltage corresponding to said desired temperature, amplifier means, and first circuit means interconnecting said temperature sensing means and said preselector means with the input of said amplifier means in such a manner that any temperature deviation of the prevailing temperature in the gas turbine drive unit from the preselected desired temperature is represented at the output of said amplifier means as a direct-current voltage, the polarity of which corresponds to the direction of control deviation, second circuit means operatively connecting the output of said amplifier means with one of said switching relay means to selectively adjust the latter and therewith said fuel adjusting means by said first-mentioned direct-current voltage to seek to substantially continuously adapt the prevailing temperature to said preselected desired temperature, speed-limiting control means responsive to the speed of the drive unit and including generator means operatively connected with and producing a voltage proportional to the speed of the drive unit, potentiometer means for reducing said last-mentioned voltage, and third circuit means operatively connecting said generator means with said last-mentioned potentiometer means to represent the deviation of the prevailing speed of the drive unit from a permissive speed thereof as a direct-current voltage, and fourth circuit means operatively connecting said third circuit means with the other of said switching relay means in such a manner that said speed-responsive control means overrides said temperature-responsive control means only in response to said gas turbine drive unit exceeding a predetermined permissive rotational speed to temporarily reduce thereby the quantity of injected fuel, said fourth circuit means including diode means effectively and substantially blocking any current flow in said fourth circuit means until shortly before said maximum permissive speed is reached, and a by-pass line in said working circuit including resistance means in shunt with both of said switching relay means.

4. A control installation for selectively controlling the fuel quantity for gas turbine drive units, comprising:

fuel supply means provided with fuel adjusting means effectively enabling adjustment of the metered fuel quantity to be injected into the drive unit and with a working circuit having switching means for effectively controlling said fuel adjusting means, temperature responsive control means operable to control said turbine drive unit in dependence on the temperature of the produced driving gases including temperature sensing means exposed to said driving gases, preselector means capable of continuously preselecting a desired temperature having potentiometer means establishing a preselected voltage corresponding to said desired temperature, amplifier means, and first circuit means interconnecting said temperature sensing means and said preselector means with the input of said amplifier means in such a manner that any temperature deviation of the prevailing temperature in the gas turbine drive unit from the preselected desired temperature is represented at the output of said amplifier means as a direct-current voltage, the polarity of which corresponds to the direction of control deviation, second circuit means operatively connecting the output of said amplifier means with switching means to selectively adjust the latter by said first-mentioned direct-current voltage to seek to substantially continuously adapt the prevailing temperature to said preselected desired temperature, speed-limiting control means responsive to the speed of the drive unit and including generator means producing a voltage proportional to the speed of the drive unit, potentiometer means for reducing said last-mentioned voltage, and third circuit means operatively connecting said generator means with said last-mentioned potentiometer means to represent the deviation of the prevailing speed of the drive unit from a permissive speed thereof as a direct-current voltage, fourth circuit means operatively connecting said third circuit means with said switching means such that said speed-responsive control means overrides said temperature-responsive control means only in response to said gas turbine drive unit exceeding a predetermined permissive rotational speed to temporarily reduce thereby the quantity of injected fuel, said fourth circuit means including means effectively and substantially blocking any current flow in said fourth circuit means until shortly before the maximum permissive speed is attained, and preselector means for selectively actuating said first-mentioned potentiometer means including means for regulating the adjusting movement of said preselector means in direction of acceleration of the drive unit in dependence on one of the two magnitudes consisting of compressor discharge pressure and rotational speed of the compressor of the drive unit, said temperature responsive control means providing sole control of said fuel-adjusting means at all times including normal cruising of said gas turbine drive unit and being over-ridden by said speed-limiting control means only in response to the drive unit exceeding said permissive speed.

5. A control installation for selectively controlling the fuel quantity for gas turbine drive units, comprising:

fuel supply means provided with fuel adjusting means effectively enabling adjustment of the metered fuel quantity to be injected into the drive unit and with a working circuit having switching means for effectively controlling said fuel adjusting means, temperature responsive control means operable in dependence on the temperature of the produced driving gases including temperature sensing means exposed to said driving gases, preselector means for preselecting a desired temperature having potentiometer means establishing a preselected voltage corresponding to said desired temperature, amplifier means, and first circuit means interconnecting said temperature sensing means and said preselector means with the input of said amplifier means in such a manner that any temperature deviation of the prevailing temperature in the gas turbine drive unit from the preselected desired temperature is represented at the output of said amplifier means as a direct-current voltage, the polarity of which corresponds to the direction of control deviation, second circuit means operatively connecting the output of said amplifier means with switching means to selectively adjust the latter by said first-mentioned direct-current voltage to seek to adapt the prevailing temperature to said preselected desired temperature, speed-limiting control means responsive to the speed of the drive unit and including generator means producing a voltage proportional to the speed of the drive unit, potentiometer means for reducing said last-mentioned voltage, and third circuit means operatively connecting said generator means with said last-mentioned potentiometer means to represent the deviation of the prevailing speed of the drive unit from a permissive speed thereof as a direct-current voltage, fourth circuit means operatively connecting said third circuit means with said switching means in such a manner that said speed-responsive control means overrides said temperature-responsive control means with said gas turbine drive unit exceeding a predetermined permissive rotational speed to temporarily reduce thereby the quantity of injected fuel, said fourth circuit means including means effectively and substantially blocking any current flow in said fourth circuit means until shortly before reaching the maximum permissive speed, and preselector means for selectively actuating said first-mentioned potentiometer means including means for regulating the adjusting movement of said preselector means in direction of acceleration of the drive unit in dependence on one of the two magnitudes consisting of compressor discharge pressure and rotational speed of the compressor of the drive unit, said last-mentioned pre-selector means including a manually operable lever, an adjusting cam secured to said lever, a toothed rack meshing with a pinion effecting adjustment of said first-mentioned potentiometer means, a plunger engaging with said cam, and spring means connecting said plunger with one end of said rack, abutment means in operative engagement with the other end of said rack, and means for actuating said abutment means in dependence on one of said two control magnitudes and having one of two parts consisting of pressure responsive elements and centrifugal governor, respectively.

6. A control installation for selectively controlling the fuel quantity for gas turbine drive units provided with a compressor shaft and with an output shaft, comprising:

fuel supply means provided with fuel adjusting means effectively enabling adjustment of the metered fuel quantity to be injected into the drive unit and with a working circuit having switching means for effectively controlling said fuel adjusting means, temperature responsive control means operable in dependence on the temperature of the produced driving gases including temperature sensing means exposed to said driving gases, preselector means for preselecting a desired temperature having potentiometer means establishing a preselected voltage corresponding to said desired temperature, amplifier means, and first circuit means interconnecting said temperature sensing means and said preselector means with the input of said amplifier means in such a manner that any temperature deviation of the prevailing temperature in the gas turbine drive unit from the preselected desired temperature is represented at the output of said amplifier means as a direct-current voltage, the polarity of which corresponds to the direction of control deviation, second circuit means operatively connecting the output of said amplifier means with switching means to selectively adjust the latter by said first-mentioned direct-current voltage to seek to adapt the prevailing temperature to said preselected desired temperature, speed-limiting control means response to the speed of the drive unit and including generator means producing a voltage proportional to the speed of the drive unit, means drivingly connecting said generator means with both said compressor shaft and said output shaft to drive said generator means from that one of said two last-mentioned shafts which rotates at a higher speed including overrunning clutch means between said generator means and each of said two last-mentioned shafts, potentiometer means for reducing said last-mentioned voltage, and third circuit means operatively connecting said generator means with said last-mentioned potentiometer means to represent the deviation of the prevailing speed of the drive unit from a permissive speed thereof as a direct-current voltage.

fourth circuit means operatively connecting said third circuit means with said switching means in such a manner that said speed-responsive control means overrides said temperature-responsive control means with said gas turbine drive unit exceeding a predetermined permissive rotational speed to temporarily reduce thereby the quantity of injected fuel, said fourth circuit means including means effectively and substantially blocking any current flow in said fourth circuit means until shortly before reaching the maximum permissive speed, and preselector means for selectively actuating said first-mentioned potentiometer means including means regulating the adjusting movement of said preselector means in direction of acceleration of the drive unit in dependence on one of the two magnitude consisting of compressor discharge pressure and rotational speed of the compressor of the drive unit, said last-mentioned preselector means including a manually operable lever, an adjusting cam secured to said lever, a toothed rack meshing with a pinion effecting adjustment of said first-mentioned potentiometer means, a plunger engaging with said cam, and spring means connecting said plunger with one end of said rack, abutment means in operative engagement with the other end of said rack, and means for actuating said abutment means in dependence on one of said two control magnitudes and having one of two parts consisting of pressure responsive elements and centrifugal governor, respectively.

7. A control installation for selectively controlling the fuel quantity for gas turbine drive units, comprising:

fuel supply means provided with fuel adjusting means effectively enabling adjustment of the metered fuel quantity to be injected into the drive unit and with a working circuit having a first electrical path and a shunt path having two transistor switch means for effectively controlling said fuel adjusting means, temperature responsive control means operable to control the operation of said turbine drive unit in dependence on the temperature of the produced driving gases including temperature sensing means exposed to said driving gases, manually operable preselector means capable of continuously preselecting a desired temperature during turbine operation having potentiometer means establishing a preselected voltage corresponding to said desired temperature, amplifier means, and first circuit means interconnecting said temperature sensing means and said preselector means with the input of said amplifier means in such a manner that any temperature deviation of the prevailing temperature in the gas turbine drive unit from the preselected desired temperature is represented at the output of said amplifier means as a direct-current voltage, the polarity of which corresponds to the direction of control deviation, second circuit means operatively connecting the output of said amplifier means with one transistor switching means to selectively open said shunt path by said first-mentioned direct-current voltage to seek to substantially continuously adapt the prevailing temperature to said preselected desired temperature, speed-limiting control means responsive to the speed of the drive unit and including generator means producing a voltage proportional to the speed of the drive unit, potentiometer means for reducing said last-mentioned voltage, and third circuit means operatively connecting said generator means with said last-mentioned potentiometer means to represent the deviation of the prevailing speed of the drive unit from a permissive speed thereof as a direct-current voltage, fourth circuit means operatively connecting said third circuit means with the other of said transistor switching means in such a manner that said speed-responsive control means overrides said temperature-responsive control means only in response to said gas turbine drive unit exceeding a predetermined permissive rotational speed to temporarily reduce thereby the quantity of injected fuel, said fourth circuit means including means effectively and substantially blocking any current flow in said fourth circuit means until shortly before reaching the maximum permissive speed, said temperature-responsive control means providing sole control of said fuel-adjusting means at all times including normal cruising of said gas turbine drive unit and being over-ridden by said speed-limiting control means only in response to the drive unit exceeding said permissive speed.

References Cited by the Examiner
UNITED STATES PATENTS

| | | | |
|---|---|---|---|
| 1,140,926 | 5/1915 | Varney | 318—48 |
| 1,615,643 | 1/1927 | Mickey | 158—36.4 |
| 2,623,354 | 12/1952 | Best | 60—39.28 |
| 2,764,867 | 10/1956 | Farkas | 60—39.28 |
| 2,790,303 | 4/1957 | Kutzler | 60—39.28 X |
| 2,800,015 | 7/1957 | Shaw | 60—39.28 |
| 2,805,546 | 9/1957 | Lawry | 60—39.28 |
| 2,847,824 | 8/1958 | Best | 60—39.28 |
| 2,933,887 | 4/1960 | Davies | 60—39.28 |
| 2,948,114 | 8/1960 | Beslier | 60—39.28 |
| 3,027,704 | 4/1962 | Dmitroff | 60—97 |
| 3,032,985 | 5/1962 | Alexander | 60—39.16 |
| 3,089,306 | 5/1963 | Fitchie | 60—39.28 |
| 3,098,356 | 7/1963 | Joline | 60—39.28 |

JULIUS E. WEST, *Primary Examiner.*

ABRAM BLUM, SAMUEL LEVINE, *Examiners.*